United States Patent
Lengacher et al.

(10) Patent No.: US 7,429,804 B2
(45) Date of Patent: Sep. 30, 2008

(54) LIFT GATE POWER CONTROL SYSTEM

(75) Inventors: Nicholas D. Lengacher, Fort Wayne, IN (US); Burnell L. Bender, Woodburn, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 618 days.

(21) Appl. No.: 10/950,007

(22) Filed: Sep. 24, 2004

(65) Prior Publication Data

US 2006/0071553 A1    Apr. 6, 2006

(51) Int. Cl.
*B60L 1/00*    (2006.01)
(52) U.S. Cl. ....................................... 307/9.1
(58) Field of Classification Search ............. 307/9.1
See application file for complete search history.

(56) References Cited

U.S. PATENT DOCUMENTS

| | | | |
|---|---|---|---|
| 3,979,657 A | 9/1976 | Yorksie | |
| 4,073,203 A * | 2/1978 | Wurst et al. | 477/129 |
| 4,473,815 A * | 9/1984 | Miller, Sr. | 340/426.3 |
| 4,950,913 A * | 8/1990 | Kephart | 307/10.7 |
| 5,272,386 A | 12/1993 | Kephart | |
| 6,383,394 B1 * | 5/2002 | Briggs et al. | 210/671 |
| 2004/0145496 A1 * | 7/2004 | Ellis | 340/905 |

* cited by examiner

*Primary Examiner*—Michael J Sherry
*Assistant Examiner*—Dru M Parries
(74) *Attorney, Agent, or Firm*—Jeffrey P. Calfa; Gerald W. Askew

(57) ABSTRACT

A lift gate (12) is raised and lowered on a motor vehicle by a prime mover. An electrical system of the vehicle has at least one D.C. storage battery (22) for raising and lowering the lift gate when the vehicle engine is not running. A disconnect, such as a mag switch (20) carries electricity from the battery to the prime mover when actuated to an enabling condition. Control logic for selectively enabling and unenabling the disconnect to carry electricity to the prime mover from the battery includes a control input (28, 32), a source providing battery voltage data corresponding to actual battery voltage (26), and a timer in an ESC (24). The control logic causes the disconnect to become and remain enabled upon the control input requesting enablement of the disconnect and battery voltage data indicating actual battery voltage in compliance with a defined criterion until the earlier occurrence of 1) elapse of a length of time set by the timer and 2) battery voltage data disclosing non-compliance with the defined criterion.

2 Claims, 3 Drawing Sheets

LIFT GATE POWER CONTROL SYSTEM

FIELD OF THE INVENTION

This invention relates generally to motor vehicles that have lift gates. More specifically it relates to an electrical control system for selectively controlling a disconnect to selectively allow and disallow electric power from one or more storage batteries to be available for operating a lift gate.

BACKGROUND OF THE INVENTION

Various types of lift gates are commercially available for installation and use in motor vehicles. A common characteristic of a lift gate is that it comprises a platform that can be raised and lowered to allow a load to be loaded onto or unloaded from a vehicle and thereafter stowed.

For example, a typical lift gate may be installed at the rear of the bed or cargo area of a truck. The lift gate can be lowered to ground level to allow a load to be placed on the lift gate platform. The platform is then raised to the level of the truck bed or cargo floor where the load can be moved onto the bed or floor. When the load is to be unloaded, it is placed on the platform, and the lift gate is lowered to ground level where the load can be moved off the platform. When not being used, the lift gate is typically operated to a stowed position where the platform is either generally vertical or folded in under the bed.

It is typical for the vehicle's own electrical power to be used for powering the lift gate. One type of lift gate has an electric motor that raises and lowers the platform through a mechanical mechanism. Another type has an electric motor that operates a hydraulic pump that provides hydraulic power for operating the lift gate. Operation may occur through one or more hydraulic cylinders.

In all of those cases, electric power for raising and lowering the lift gate is drawn from the motor vehicle's electrical system although it is to be appreciated that more power is likely to be drawn when a load on the lift gate platform is being raised than when it is being lowered.

When the engine that powers the motor vehicle is running, an alternator supplies the vehicle electrical system needs while keeping the vehicle battery or battery bank charged to proper voltage. When the engine is not running, the vehicle electrical system needs must be supplied by the vehicle battery or battery bank. Because operation of a vehicle's lift gate will usually occur while the vehicle is parked, the lift gate has to draw electricity solely from the battery or battery bank if the engine is not kept idling while the vehicle is parked.

If a lift gate is powered directly from a battery or battery bank through a circuit breaker, battery power remains available to the lift gate thereby raising the possibility for unauthorized operation of the lift gate. Moreover, the batteries can possibly be discharged to the point where they cannot operate the lift gate any more, and consequently will be incapable of starting the engine.

SUMMARY OF THE INVENTION

The inventors believe that it would be desirable to guard against unauthorized usage of the lift gate and usage that could potentially drain the battery or battery bank to a point where insufficient power would be left for cranking the engine at starting.

Accordingly, one object of the present invention is to provide a control system that avoids those potential situations while still allowing some use of the lift gate while the engine is not running.

Briefly, a preferred embodiment of the invention comprises an electronic systems controller (ESC) and a Battery Protection Module (BPM) that monitors the battery voltage and controls a mag switch capable of carrying large D.C. currents, that can reach up to some 200 amps. The ESC is an electronic assembly that has multiple analog and digital input channels to monitor switches and sensors for the control of vehicle electrical loads through solid state (FET) switching controlled by an internal microprocessor.

The ESC activates and provides a timeout feature for the BPM. The ESC and BPM will jointly enable battery power for operating the lift gate when the ESC detects activation of a momentary switch on the dash or instrument panel of the vehicle or activation of the AUX button of a keyless entry thumb fob and the BPM determines the existence of proper battery voltage that is appropriate for allowing the lift gate to be operated.

The BPM also monitors duration of time that battery voltage is below a predetermined level. If battery voltage does not recover during that time, battery power to the lift gate is stopped. That is primarily intended to avoid draining the battery while the engine is not running. With the engine running, proper battery voltage will typically be maintained and the low voltage time-out feature will not activate.

An alarm is another feature. With the engine not running and with the vehicle ignition switch in any position but CRANK or OFF, the ESC will activate the alarm when battery voltage drops below some programmable value, 11.5 volts for example in a nominal 12.0 volt system, for more than a selected amount of time, such as 60 seconds for example. The alarm is to alert the vehicle operator that the engine needs to be started to recharge the batteries before power to the lift gate is discontinued due to low battery voltage. The alarm is given in any suitable way, an audible is preferred, for a selected amount of time, after which, power to the lift gate mechanism is discontinued. In the event the voltage recovered to a voltage higher than the threshold voltage during the alarm period, the alarm will be shut off and time out timer will be stopped and reset.

With the engine not running and with the ignition switch in OFF position, the ESC and BPM will allow battery power to the lift gate for a timed period, such as one hour. The BPM monitors battery voltage during that period and if conditions are suitable, operates the mag switch closed. Unsuitable conditions will cause the mag switch to open at any time, and in any event the mag switch will open after the allowed timed period has elapsed as controlled by the ESC.

The mag switch will also open if the momentary switch is cycled to an OFF position or the vehicle speed rises above some selected speed such as three MPH.

Lift gate power can be restored through the ESC, if timed out, via the momentary switch or the keyless entry AUX button. If lift gate power is discontinued due to low battery voltage with the engine not running and the vehicle ignition switch in OFF position, the power will be restored through the BPM, as long as the ESC has not timed out, only after the battery voltage recovers above some level, such as 12.1 volts in a nominal 12.0 volt system. Such recovery will typically occur when the engine is started.

The length of time for the ESC time-out feature is programmable, for a customer's preferred time frame, to help prevent unauthorized uses of the lift gate, such as when the vehicle has been left unattended for an extended period of time. The low voltage feature helps prevent deep cycling of the batteries that can shorten battery life, but perhaps more importantly assures that sufficient battery power is available for re-starting the engine thus eliminating expensive service calls to have the vehicle re-started.

It is desirable to mount the momentary switch in the instrument cluster panel and to provide a visible indication of switch status, i.e. ON or OFF. A virtual fuse protects this circuitry to the BPM.

One generic aspect of the present invention relates to a motor vehicle having an engine for powering the vehicle, a lift gate comprising a platform that is raised and lowered on the vehicle by a prime mover, and an electrical system comprising at least one electric storage battery for raising and lowering the lift gate when the engine is not running and a control system comprising a disconnect for carrying electricity from the battery to the prime mover.

Control logic for selectively enabling and unenabling the disconnect to carry electricity to the prime mover from the battery, includes a control input, a source providing battery voltage data corresponding to actual battery voltage, and a timer.

The control logic causes the disconnect to become and remain enabled upon the control input requesting enablement of the disconnect and battery voltage data indicating actual battery voltage in compliance with a defined criterion until the earlier occurrence of 1) elapse of a length of time set by the timer and 2) battery voltage data disclosing non-compliance with the defined criterion.

Another generic aspect relates to a control system comprising control logic for selectively enabling and unenabling battery voltage to the lift gate, including a control input to an electronic systems controller having an output connected to an input of a battery protection module that has an output connected to a controlling element of a switch device, wherein the switch device enables battery voltage to the lift gate with the concurrence of the control input requesting battery voltage to the lift gate and the battery protection module indicating a condition of the battery suitable for operating the lift gate.

Still another generic aspect relates to the control logic as described.

The invention also includes a method selectively enabling and unenabling the disconnect to carry electricity to the prime mover from the battery by causing the disconnect to become and remain enabled upon a request for enablement of the disconnect and the state of charge of the battery being in compliance with a defined criterion until the earlier occurrence of 1) elapse of a defined length of time and 2) a source of battery data disclosing non-compliance of the state of charge with the defined criterion.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
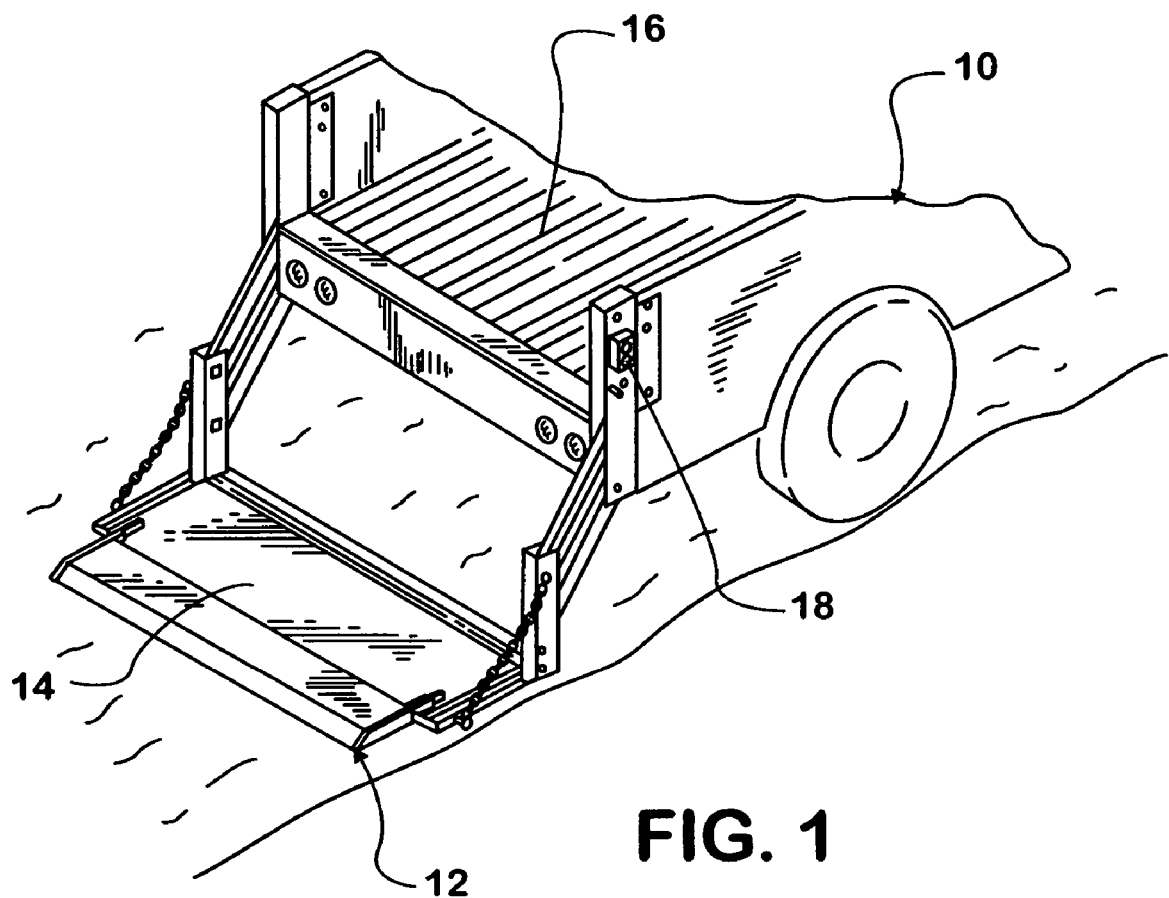
FIG. 1 is a perspective view showing a representative lift gate.

FIG. 1 shows the rear of a motor vehicle 10, such as a truck, having a representative lift gate 12. In FIG. 1, lift gate 12 is shown lowered with its platform 14 horizontal and on the ground. Lift gate 12 can be operated to raise platform 14 to the level of the floor 16 of the bed or cargo area of vehicle 10, and thereafter operated to a stowed position.

Operation of lift gate 12 is performed by controls such as a switch or switches 18 that are conveniently placed for access by a responsible person using the lift gate to move a load into or out of the vehicle. The lift gate is powered by the electrical system of vehicle 10 comprising one or more storage batteries and a charging system (engine-driven alternator) for maintaining proper battery charge. When the engine is running the alternator can supply electricity for the lift gate, but when the engine is not running, electricity for the lift gate is available only from the battery or battery bank.

A prime mover such as an electric motor or actuator operates the lift gate through a mechanical mechanism or a hydraulic mechanism. The invention is concerned with selectively allowing and disallowing electric power to be available for operating the lift gate. When power is being allowed, actuation of the switch or switches 18 will control the lift gate movement. When power is being disallowed, actuation of the switch or switches will be ineffective to move the lift gate.

Figure 2:
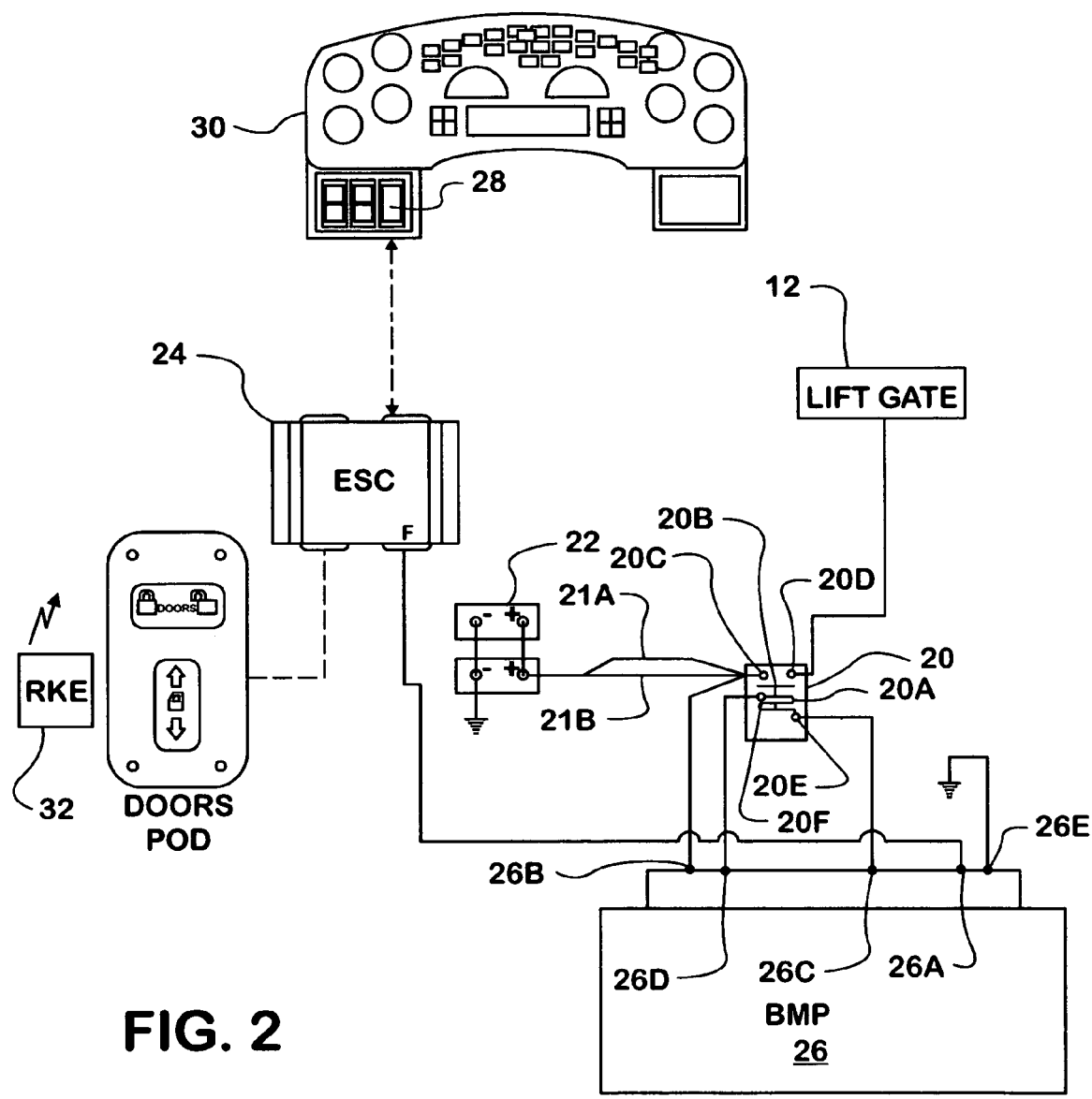
FIG. 2 is schematic block diagram of an electrical control for the lift gate according to principles of the invention.

FIG. 2 shows a magneto-actuated switch (mag switch) 20 for carrying electricity from a storage battery, or a bank of storage batteries, 22 in vehicle 10 to lift gate 12. Mag switch 20 is shown in an unenabling position. Only when it is operated to an enabling position, can mag switch 20 carry electricity from battery, or batteries, 22 to the lift gate prime mover in response to actuation of switch, or switches, 18.

Associated with mag switch 20 are an electronic systems controller (ESC) 24 and a Battery Protection Module (BPM) 26. ESC 24 is an electronic assembly that has multiple analog and digital input channels to monitor switches and sensors for the control of vehicle electrical loads through solid state (FET) switching controlled by an internal microprocessor. One of those switches is a lift gate enablement switch 28 shown mounted in an instrument cluster 30 inside the occupant compartment of vehicle 10 and multiplexed to an input of ESC 24.

ESC 24 may have a battery voltage monitoring capability, but if that capability is dependent on the vehicle ignition switch being in a position other than OFF or CRANK, it will not be effective to monitor battery voltage when the vehicle ignition switch is operated to OFF position to stop the engine. BPM 26 however continually monitors battery voltage, independent of the ignition switch position, by virtue of its direct connection across the battery or battery bank. Consequently, in the disclosed embodiment of the invention described here, it is BPM 26 that is effective in monitoring battery voltage when the engine is not running as well as when the engine is running.

When switch 28 is actuated to an enabling position, a position that may be only momentary, a signal requesting enablement of battery power to the lift gate is given to ESC 24. Activation of the AUX button of a remote keyless entry (RKE) thumb fob 32 will activate a radio transmitter to transmit a radio signal to a radio receiver in the vehicle that also provides to ESC 24 a signal requesting enablement of battery power to the lift gate. Hence, the disclosed embodiment of the invention provides two ways for requesting battery power for the lift gate.

ESC has an output hard-wired to a terminal 26A of BPM 26. BMP 26 has other terminals 26B, 26C, 26D, and 26E. Mag switch 20 has a solenoid 20A, a movable contact 20B operated by solenoid 20A, and terminals 20C, 20D, 20E, and 20F.

Terminals 20C and 26B are connected to the positive side of battery, or batteries 22, with the negative side being grounded. Terminal 26C is connected to terminal 20E and terminal 26D is connected to terminal 20F, thereby placing solenoid 20A across an output of BPM 26. Terminal 26E is grounded. Terminal 20D is connected to electric circuitry associated with lift gate 12.

In the unenabling position shown, solenoid 20A is not energized, and contact 20B is not made to terminals 20D and 20C, thereby preventing battery power from being available to lift gate 12, and as a result prohibiting lift gate operation.

In the enabling position, solenoid 20A is energized by BPM 26, and contact 20B is made to terminals 20D and 20C, thereby making battery power available to lift gate 12 so that the lift gate can be operated by switch or switches 18.

How ESC 24 and BPM 26 cooperate to selectively allow and disallow electricity through mag switch 20 to the lift gate will be explained with reference to the logic diagram of FIG. 3 beginning at START 40.

If ESC 24 indicates from certain data such as battery voltage that the engine is running (reference numeral 42) and solenoid 20A is energized (reference numeral 44), lift gate 12 is enabled to be operated by switch or switches 18 until the earlier occurrence of 1) enablement switch 28 being operated to an unenabling position, 2) the ESC timer timing out, or 3) the engine being shut off (reference numeral 46) and battery voltage dropping below predetermined level. As long as the engine continues to run, the batteries will be kept charged to maintain acceptable battery voltage.

Figure 3:
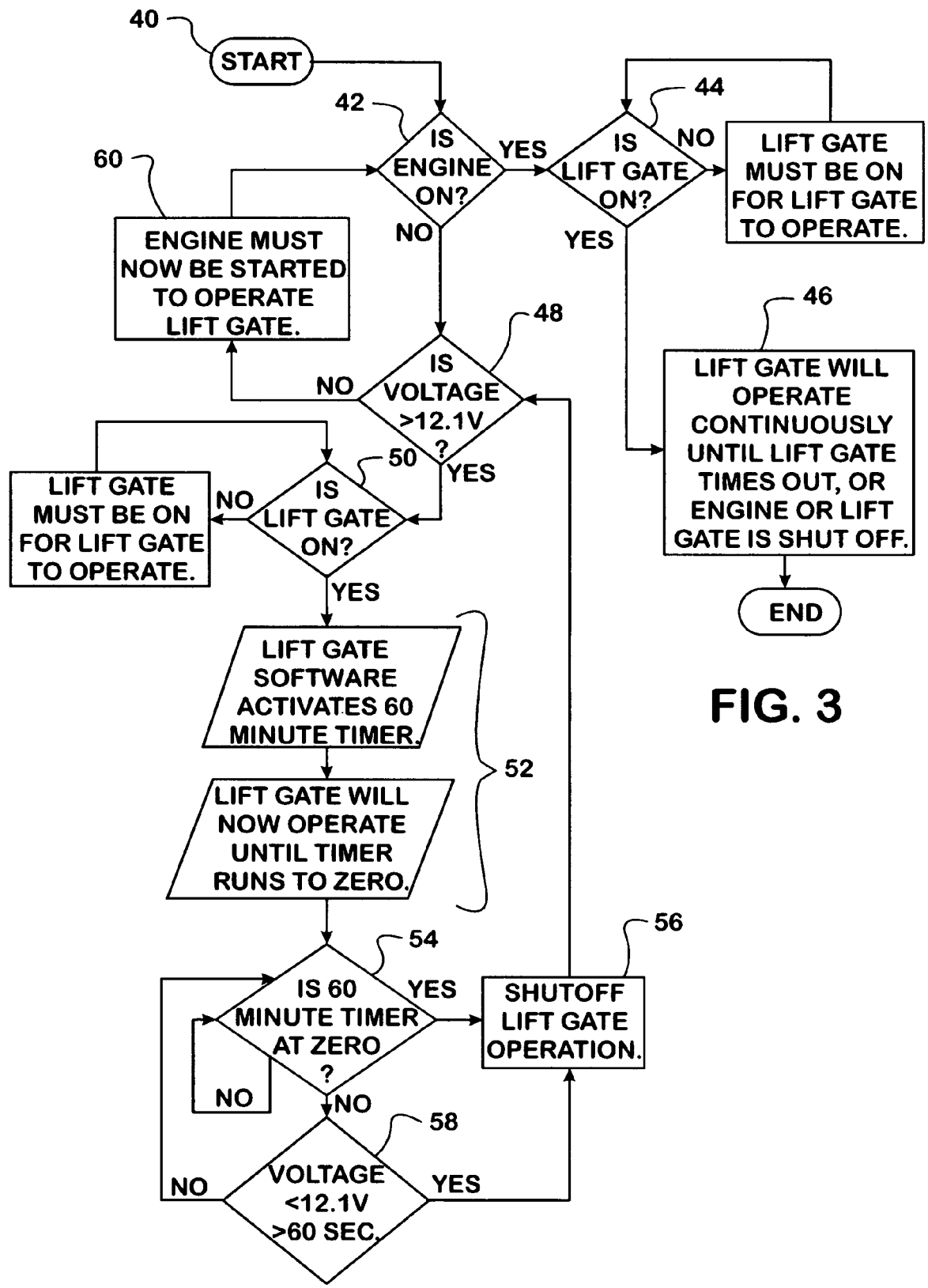
FIG. 3 is a control logic diagram for the lift gate electrical control.

If step 42 discloses that the engine is not running (even through the ignition switch may be in RUN position), then BPM 26 processes battery voltage data representing actual battery voltage against a defined threshold value, such as 12.1 volts as marked in FIG. 3. If the data discloses that actual voltage exceeds the threshold (reference numeral 48), then a step 50 determines if switch 28 is requesting enablement. If so, a timer in ESC 24 starts timing, and ESC signals BPM 26 to energize solenoid 20A. The timer will count for a defined length of time, such as sixty minutes (reference numeral 52).

From time to time, a step 54 determines how much time has been counted by the timer. Once the timer times out, solenoid 20A is de-energized causing contact 20B to open and discontinue battery power to the lift gate. From time to time before the timer times out, a measure of actual battery voltage is also compared against the threshold of 12.1 volts (reference numeral 58). If the measure of battery voltage remains at or below that threshold for longer than a defined amount of time, sixty seconds for example, then solenoid 20A is de-energized causing contact 20B to open and discontinue battery power to the lift gate.

Once battery power to the lift gate has been discontinued due to low battery voltage, it can be restored only if battery voltage returns to above the threshold. If the battery has been drained to a point where its voltage remains below the threshold, the battery will have to be re-charged, and that typically occurs when the engine is re-started (reference numeral 60).

By setting an appropriate threshold, the battery will not be drained to a point that prevents it from cranking the engine starting motor to re-start the engine. And at that, operation of either switch 28 to the enablement position or activation of the AUX button of a remote keyless entry (RKE) thumb fob 32 will be necessary to cause mag switch 20 to close contact 20B, provided that battery voltage is at or above acceptable level.

An example of a suitable BPM 26 is Model CI 300-LG supplied by California & Indiana Research & Development.

While a presently preferred embodiment of the invention has been illustrated and described, it should be appreciated that principles of the invention apply to all embodiments falling within the scope of the following claims.

What is claimed is:

1. A motor vehicle comprising:
   an engine for powering the vehicle;
   a lift gate comprising a platform that is raised and lowered on the vehicle by a prime mover;
   an electrical system comprising at least one electric storage battery for operating the prime mover to raise and lower the lift gate when the engine is not running and a control system that comprises a disconnect for carrying electricity from the battery to the prime mover; and
   control logic for selectively enabling and unenabling the disconnect to carry electricity to the prime mover from the battery, including a control input, a source providing battery voltage data corresponding to actual battery voltage, and a timer, wherein the control logic causes the disconnect to become and remain enabled upon the control input requesting enablement of the disconnect and battery voltage data indicating actual battery voltage in compliance with a defined criterion until the earlier occurrence of 1) elapse of a length of time set by the timer and 2) battery voltage data disclosing non-compliance with the defined criterion;
   including an ignition switch that is selectively operable respectively to CRANK, RUN, and OFF positions A) for connecting an engine cranking circuit to the battery at starting, B) for connecting an engine run circuit to the battery after the engine has been started and is running, and C) for disconnecting the engine run circuit from the battery, respectively, and an alarm device for giving an alarm, wherein when the ignition switch is placed in RUN position with the engine not running, the control logic causes the alarm device to give an alarm after the battery voltage data has disclosed non-compliance with a minimum permissible battery voltage established by the defined criterion for an interval of time established by the defined criterion, the defined criterion being contained in the control logic.

2. A motor vehicle as set forth in claim 1 wherein elapse of the interval of time established by the defined criterion is measured by a further timer, and while the further timer is timing, the control logic causes the further timer to be reset upon resumption of compliance of the battery voltage data with the minimum permissible battery voltage established by the defined criterion.

* * * * *